(12) United States Patent
Dobashi

(10) Patent No.: US 11,960,139 B2
(45) Date of Patent: Apr. 16, 2024

(54) CAMERA MODULE

(71) Applicant: SONY SEMICONDUCTOR SOLUTIONS CORPORATION, Kanagawa (JP)

(72) Inventor: Eiichiro Dobashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 797 days.

(21) Appl. No.: 16/970,773

(22) PCT Filed: Feb. 13, 2019

(86) PCT No.: PCT/JP2019/004932
§ 371 (c)(1),
(2) Date: Aug. 18, 2020

(87) PCT Pub. No.: WO2019/167607
PCT Pub. Date: Sep. 6, 2019

(65) Prior Publication Data
US 2021/0096318 A1 Apr. 1, 2021

(30) Foreign Application Priority Data

Feb. 27, 2018 (JP) .................................. 2018-033206

(51) Int. Cl.
*G02B 7/02* (2021.01)
*G02B 1/11* (2015.01)
*G02B 5/20* (2006.01)

(52) U.S. Cl.
CPC .................. *G02B 7/02* (2013.01); *G02B 1/11* (2013.01); *G02B 5/208* (2013.01)

(58) Field of Classification Search
CPC ............. G02B 7/02; G02B 1/11; G02B 5/208
(Continued)

(56) References Cited

U.S. PATENT DOCUMENTS

2006/0023108 A1 2/2006 Watanabe et al.
2010/0073534 A1 3/2010 Yano
(Continued)

FOREIGN PATENT DOCUMENTS

CN 1728396 A 2/2006
CN 104659045 A 5/2015
(Continued)

OTHER PUBLICATIONS

Translationof2014096622 (Year: 2023).*
(Continued)

*Primary Examiner* — Jerry L Brooks
(74) *Attorney, Agent, or Firm* — CHIP LAW GROUP

(57) ABSTRACT

The present technology relates to a camera module that is enabled to have a lower height. The camera module includes a supporting component that includes an opening through which light from a lens collecting the light passes, the supporting component supporting an optical component between the lens and an imaging element that performs photoelectric conversion of the light, the optical component being placed so as to cover the opening and being supported on a side of the supporting component closer to the imaging element. In addition, around the opening, there is disposed a sloped portion inclined in the thickness direction of the supporting component, and the supporting component is placed such that the slope of the sloped portion and the lens face each other. Furthermore, the camera module is configured such that a portion of the lens is placed closer to a first face of the supporting component beyond a second face of the supporting component, the portion facing the supporting component, the optical component being placed on the first face, and the second face being opposite to the first face. The present technology can be applied to, for example, a camera module that collects light to capture an image.

11 Claims, 17 Drawing Sheets

(58) Field of Classification Search
USPC .......................................................... 359/350
See application file for complete search history.

(56) References Cited

U.S. PATENT DOCUMENTS

| | | | | |
|---|---|---|---|---|
| 2010/0225854 | A1* | 9/2010 | Kawamoto | G02F 1/13363 349/96 |
| 2015/0138424 | A1* | 5/2015 | Dobashi | H04N 25/00 |
| 2017/0104904 | A1 | 4/2017 | Dobashi | |
| 2017/0163859 | A1 | 6/2017 | Dobashi | |
| 2019/0273851 | A1 | 9/2019 | Dobashi | |

FOREIGN PATENT DOCUMENTS

| CN | 110266974 | A | | 9/2019 | | |
|---|---|---|---|---|---|---|
| JP | 2006-208865 | A | | 8/2006 | | |
| JP | 2007-233262 | A | | 9/2007 | | |
| JP | 2008-233512 | A | | 10/2008 | | |
| JP | 4365743 | B2 | | 11/2009 | | |
| JP | 4999508 | B2 | | 8/2012 | | |
| JP | 2014-096622 | A | | 5/2014 | | |
| JP | 2014096622 | | * | 5/2014 | .............. | G02B 7/02 |
| JP | 2015-099262 | A | | 5/2015 | | |
| JP | 2016-080865 | A | | 5/2016 | | |
| JP | 6430206 | B2 | | 11/2018 | | |
| KR | 10-2006-0010686 | A | | 2/2006 | | |
| KR | 10-2007-0046041 | A | | 5/2007 | | |
| TW | I249344 | B | | 2/2006 | | |
| WO | 2016/060198 | A1 | | 4/2016 | | |

OTHER PUBLICATIONS

International Search Report and Written Opinion of PCT Application No. PCT/JP2019/004932, dated Apr. 9, 2019, 09 pages of ISRWO.

Extended European Search Report of EP Application No. 19760433.3, dated Mar. 4, 2021, 06 pages.

* cited by examiner

CAMERA MODULE

CROSS REFERENCE TO RELATED APPLICATIONS

This application is a U.S. National Phase of International Patent Application No. PCT/JP2019/004932 filed on Feb. 13, 2019, which claims priority benefit of Japanese Patent Application No. JP 2018-033206 filed in the Japan Patent Office on Feb. 27, 2018. Each of the above-referenced applications is hereby incorporated herein by reference in its entirety.

TECHNICAL FIELD

The present technology relates to a camera module, and more particularly, to a camera module that is enabled to have a lower height.

BACKGROUND ART

For example, Patent Document 1 describes a technology for reducing or preventing the occurrence of a ghost in a camera module.

CITATION LIST

Patent Document

Patent Document 1: Japanese Patent Application Laid-Open No. 2006-208865

SUMMARY OF THE INVENTION

Problems to be Solved by the Invention

The camera module described in Patent Document 1 includes a supporting component that supports an infra red cut-off filter (IRCF), and the supporting component has an opening disposed for the purpose of passing light from a lens so that the light passing through the opening is incident on an imaging element.

In the camera module, a distance needs to be secured between the supporting component and the lens to prevent the supporting component and the lens from interfering with each other. Therefore, it has been difficult to shorten the distance between the lens and the imaging element, and thus a lens having a longer back focus (BF) has been needed. Furthermore, it has been difficult to reduce the height of the camera module.

The present technology has been made in view of such circumstances, and is intended to enable the camera module to have a lower height.

Solutions to Problems

A camera module according to the present technology includes a supporting component that includes an opening through which light from a lens collecting the light passes, the supporting component supporting an optical component between the lens and an imaging element that performs photoelectric conversion of the light, the optical component being placed so as to cover the opening and being supported on a side of the supporting component closer to the imaging element, in which the camera module is configured such that: a sloped portion inclined in a thickness direction of the supporting component is disposed around the opening; the supporting component is placed such that a slope of the sloped portion and the lens face each other; and a portion of the lens is placed closer to a first face of the supporting component beyond a second face of the supporting component, the portion facing the supporting component, the optical component being placed on the first face, and the second face being opposite to the first face.

In the camera module according to the present technology, the supporting component includes an opening through which light from a lens collecting the light passes, the supporting component supporting an optical component between the lens and an imaging element that performs photoelectric conversion of the light, the optical component being placed so as to cover the opening and being supported on a side of the supporting component closer to the imaging element. Around the opening, there is disposed a sloped portion inclined in the thickness direction of the supporting component, and the supporting component is placed such that the slope of the sloped portion and the lens face each other. A portion of the lens is placed closer to a first face of the supporting component beyond a second face of the supporting component, the portion facing the supporting component, the optical component being placed on the first face, and the second face being opposite to the first face.

Effects of the Invention

According to the present technology, the height of a camera module can be reduced.

Note that the effects described above are not restrictive, and any of effects described in the present disclosure may be included.

MODE FOR CARRYING OUT THE INVENTION

Example Configuration of Camera Module

Figure 1:
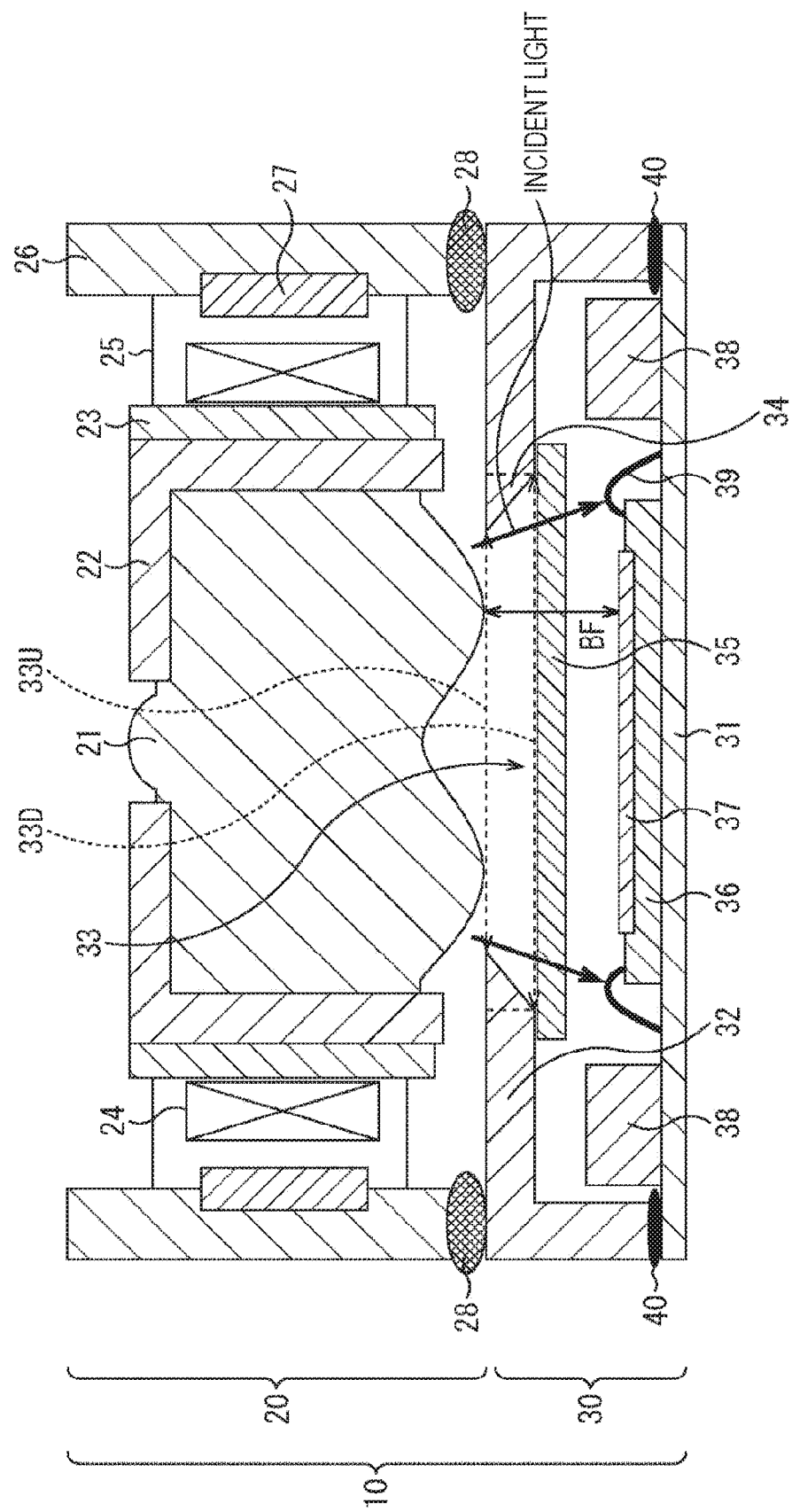
FIG. 1 is a cross-sectional view illustrating an example configuration of a camera module.

FIG. 1 is a cross-sectional view illustrating an example configuration of a camera module.

A camera module 10 illustrated in FIG. 1 includes a lens unit 20 and an imaging unit 30.

The lens unit 20 includes a lens 21, a lens barrel (barrel) 22, a lens holder 23, a coil 24, a spring 25, an actuator unit 26, and a magnet 27. The imaging unit 30 includes a substrate 31, a supporting component 32, an IRCF 35, an imaging element 36, and a mounted component 38.

In the lens unit 20, the lens 21 is built inside the lens barrel 22, and the lens barrel 22 is held by the lens holder 23. The lens holder 23 is supported in the actuator unit 26 by the spring 25 so as to be able to move in the actuator unit 26 in the vertical direction in the figure. In the lens unit 20, the focus is adjusted by vertical movement of the lens holder 23. All the cross-sectional views of the camera module herein represent the state where the lens 21 is at "micromechanical end", which means the lens 21 is at a lowest position (closer to the imaging element).

A coil 24 is disposed on a side face of the lens holder 23. A magnet 27 is disposed on the actuator unit 26 in a place facing the coil 24. When a current flows through the coil 24, the lens holder 23 on which the coil 24 is disposed is moved in the vertical direction by a magnetic field generated by the magnet 27, that is, the lens 21 moves along the optical axis, to adjust the focus.

The lens unit 20 (the actuator unit 26 of the lens unit 20) is bonded to the supporting component 32 with an adhesive 28 with the optical axis of the lens 21 aligned with the center of effective pixels 37 of the imaging element 36 directly above the imaging element 36 disposed on the substrate 31.

The supporting component 32 has an opening 33 through which light from the lens 21 is to pass, the opening 33 being disposed directly above the imaging element 36 (above the effective pixels 37 of the imaging element 36). Around the opening 33, there is disposed a sloped portion 34 inclined in the thickness direction of the supporting component 32, and the supporting component 32 is placed such that the slope of the sloped portion 34 and the imaging element 36 face each other.

The supporting component 32 is formed to have a height that enables the IRCF 35 to be fixed at an appropriate height from the imaging element 36, and the supporting component 32 is bonded to the substrate 31 with an adhesive 40.

Here, a portion of the opening 33 of the supporting component 32, the portion facing the imaging element 36, is referred to as a lower opening 33D, while a portion of the opening 33 of the supporting component 32, the portion facing the lens 21, is referred to as an upper opening 33U.

The IRCF 35 is bonded to the lower face of the supporting component 32 (the face facing the imaging element 36) with an adhesive or the like so as to cover the opening 33 of the supporting component 32.

The imaging element 36 is disposed on the substrate 31 and electrically connected to the substrate 31 by a gold wire (wire) 39.

The mounted component 38 is, for example, a capacitor, a resistor, an electronic component such as an integrated circuit (IC), or the like, and placed at a predetermined position on the substrate 31 to be electrically connected.

In the camera module 10 configured as above, the lens 21 collects light, and the light passes through the opening 33 and illuminates the imaging element 36 via the IRCF 35. On the imaging element 36, the light illuminating the imaging element 36 undergoes photoelectric conversion in the effective pixels 37, whereby an image is taken.

In the camera module 10, the slope of the sloped portion 34 is disposed so as to face the imaging element 36. In addition, in the camera module 10, the lens 21 is placed such that the bottom (lowermost) portion (the portion facing the supporting component 32) of the lens 21 is at the same height as, or slightly higher than, the upper opening 33U, in order that the tip (of the slope) of the sloped portion 34 does not interfere with the lens 21.

In the camera module 10, the lens 21 needs to be placed so as not to interfere with the tip of the sloped portion 34, which is disposed such that the slope faces the imaging element 36. Thus, it is difficult to bring down the lens 21 to a position lower than the upper opening 33U. Therefore, it is difficult to reduce the height of the camera module 10.

Furthermore, in the camera module 10, the opening 33 needs to be formed such that the upper opening 33U has at least a certain size, in order to prevent the tip of the sloped portion 34 from interfering with (the bottom of) the lens 21. Therefore, it is difficult to reduce the size of the opening 33 disposed in the supporting component 32.

As a result, the camera module 10 is highly prone to ghosts and flares (gold wire ghosts and flares) caused by the light coming from the lens 21, passing through the opening 33, incident on a region other than the effective pixels 37 of the imaging element 36, for example, incident on the gold wire 39, and reflected from the gold wire 39.

Moreover, in the camera module 10, since the sloped portion 34 is disposed such that the slope faces the imaging element 36, the lower opening 33D of the opening 33 is inevitably larger than the upper opening 33U in size. Accordingly, the IRCF 35 disposed on the underside of the supporting component 32 so as to cover the opening 33 needs to be large enough, and the camera module 10 becomes more costly as the IRCF 35 is larger in size.

First Embodiment

Figure 2:
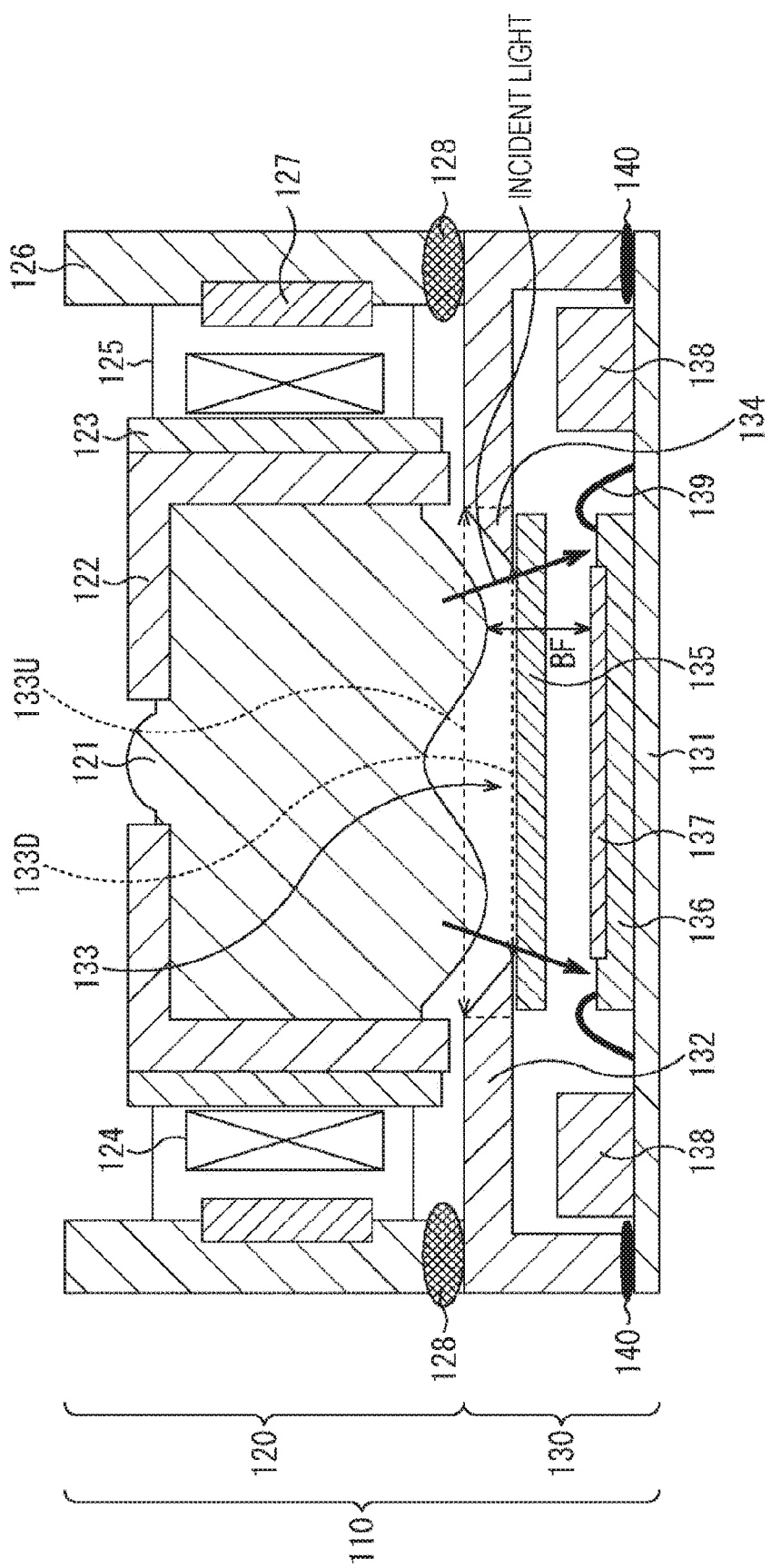
FIG. 2 is a cross-sectional view illustrating an example configuration of a camera module to which the present technology is applied according to a first embodiment.

FIG. 2 is a cross-sectional view illustrating an example configuration of a camera module to which the present technology is applied according to a first embodiment.

A camera module 110 illustrated in FIG. 2 includes a lens unit 120 and an imaging unit 130.

The lens unit 120 includes a lens 121, a lens barrel (barrel) 122, a lens holder 123, a coil 124, a spring 125, an actuator unit 126, and a magnet 127. The imaging unit 130 includes a substrate 131, a supporting component 132, an IRCF 135, an imaging element 136, and a mounted component 138.

Here, the lens 121, the lens barrel 122, the lens holder 123, the coil 124, the spring 125, the actuator unit 126, and the magnet 127 in the lens unit 120 correspond to the lens 21, the lens barrel 22, the lens holder 23, the coil 24, the spring 25, the actuator unit 26, and the magnet 27 in the lens unit 20 illustrated in FIG. 1, respectively.

Furthermore, the substrate 131, the supporting component 132, the IRCF 135, the imaging element 136, and the mounted component 138 in the imaging unit 130 correspond to the substrate 31, the supporting component 32, the IRCF 35, the imaging element 36, and the mounted component 38 in the imaging unit 30 illustrated in FIG. 1, respectively.

Note that the supporting component 132 has an opening 133 through which light from the lens 121 is to pass, the opening 133 being disposed directly above the imaging element 136 (above the effective pixels 137 of the imaging element 136). Around the opening 133, there is disposed a sloped portion 134 inclined in the thickness direction of the supporting component 132, and the supporting component 132 is placed such that the slope of the sloped portion 134 and the lens 121 face each other. Therefore, the supporting component 132 is significantly different from the supporting component 32, which is disposed such that the slope of the sloped portion 34 faces the imaging element 36, in that the supporting component 132 is disposed such that the slope of the sloped portion 134 faces the lens 121.

The supporting component 132 is formed to have a height enabling the IRCF 135 to be fixed at an appropriate height from the imaging element 136, and the supporting component 132 is bonded to the substrate 131 with an adhesive 140.

In the camera module 10 in FIG. 1, the tip of the sloped portion 34 is located on the upper face (the face facing the lens 21) of the supporting component 32, whereas in the camera module 110, the tip of the sloped portion 134 is located on the lower face (a first face) of the supporting component 132. That is, in the camera module 110, the tip of the sloped portion 134 is located lower than the tip of the sloped portion 34 in the camera module 10. Therefore, in the camera module 110, the lens 121 can be placed lower than the lens 21 in the camera module 10.

Here, a portion of the opening 133 of the supporting component 132, the portion facing the imaging element 136, is referred to as a lower opening 133D, while a portion of the opening 133 of the supporting component 132, the portion facing the lens 121, is referred to as an upper opening 133U.

In the camera module 110, the sloped portion 134 is formed such that the slope faces the lens 121. Therefore, the lens 121 can be placed lower than the lens 21 as long as the upper opening 133U is made larger than the upper opening 33U, even if the opening 133 is formed to be smaller than the opening 33 by making the upper opening 133U smaller than the lower opening 33D and making the lower opening 133D smaller than the upper opening 33U. That is, in the camera module 110, the bottom of the lens 121 (the portion facing the supporting component 132) can be placed closer to the lower face of the supporting component 132 beyond the upper face (a second face) opposite to the lower face of the supporting component 132. In FIG. 2, the lens 121 is placed such that the bottom of the lens 121 is located between the upper opening 133U (the second face) and the lower opening 133D (the first face).

Note that, in a case where the camera module 110 in FIG. 2 has a function of cutting infrared rays separately from the IRCF 135, the camera module 110 can employ, for example, a transparent and plate-like optical component such as a transparent cover film or a transparent cover glass instead of the IRCF 135, and the optical component can be supported by the supporting component 132.

Furthermore, the focus can be adjusted by vertical movement of the lens holder 123 in FIG. 2, but the lens holder 123 may be fixed to the imaging unit 130 so as not to move in the vertical direction. In this case, the camera module 110 can be configured without providing the spring 125, the actuator unit 126, and the magnet 127.

Figure 3:
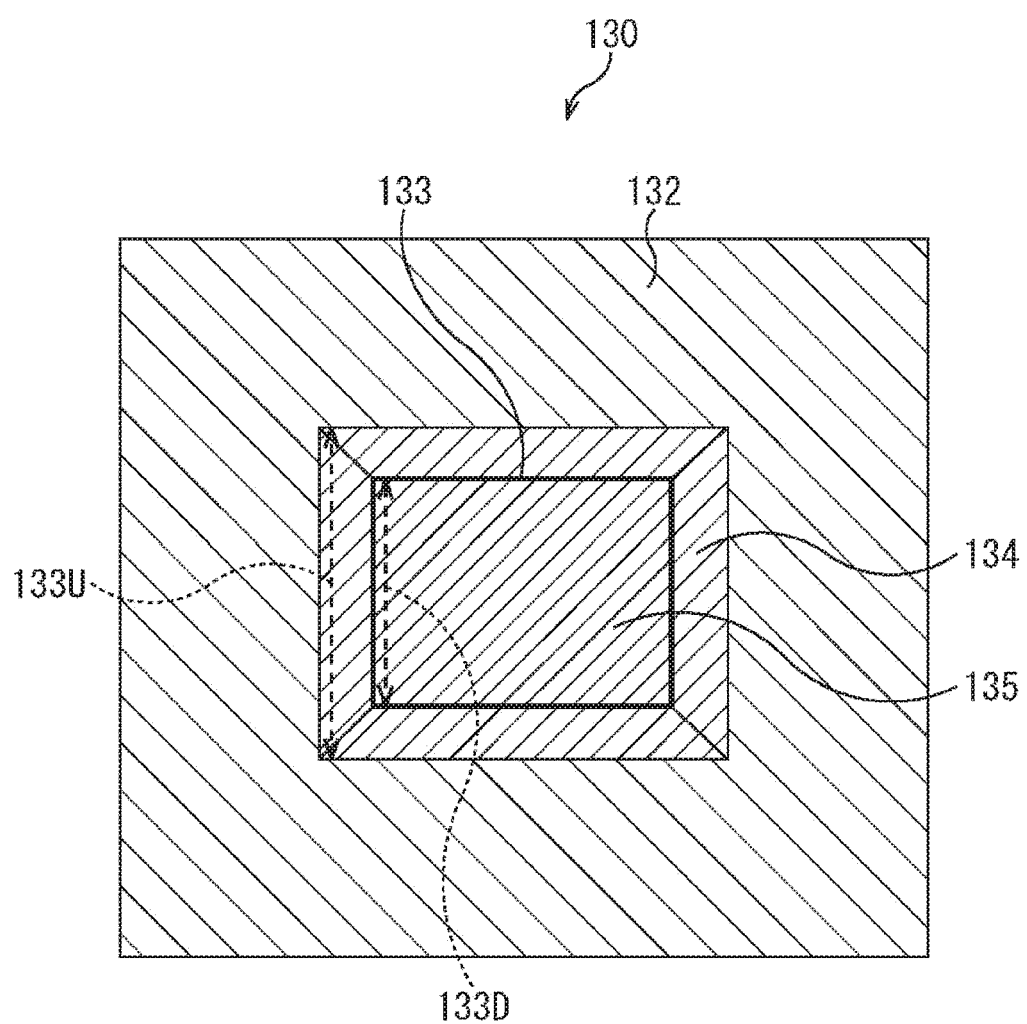
FIG. 3 is a plan view illustrating an example configuration of an imaging unit 130 in FIG. 2.

FIG. 3 is a plan view illustrating an example configuration of the imaging unit 130 in FIG. 2.

As illustrated in FIG. 3, the opening 133 being substantially rectangular is formed in the center of the supporting component 132 being substantially rectangular as viewed from above. Around the opening 133, the sloped portion 134 inclined in the thickness direction of the supporting component 132 is disposed. The slope of the sloped portion 134 is formed on the upper face (the face facing the lens 121) of the supporting component 132. The IRCF 135 is disposed on the supporting component 132 by being bonded to the lower face (the face facing the imaging element 136) of the supporting component 132 so as to cover (fill) the opening 133.

Figure 4:
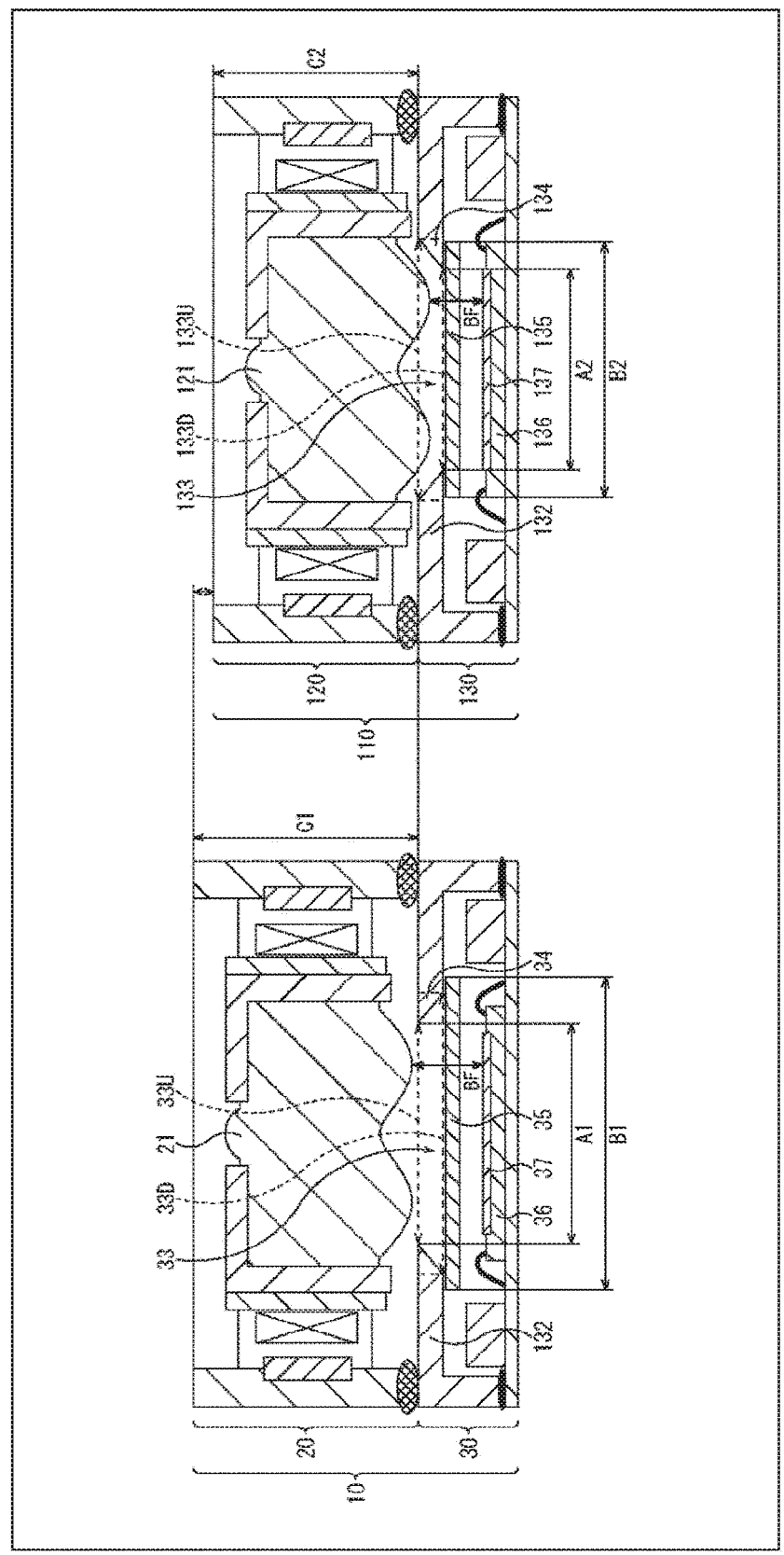
FIG. 4 is a cross-sectional view for comparing a camera module 10 with a camera module 110.

FIG. 4 is a cross-sectional view for comparing the camera module 10 with the camera module 110.

In the camera module 110, the tip of the sloped portion 134 is present lower (closer to the imaging element 136) than the tip of the sloped portion 34 in the camera module 10. Therefore, for example, when the lens 121 of the camera module 110 is at the same position as the lens 21 of the camera module 10, the distance between the tip of the sloped portion 134 and the lens 121 is longer than the distance between the tip of the sloped portion 34 and the lens 21. Therefore, the tip of the sloped portion 134 and the lens 121 in the camera module 110 are less likely to interfere with each other than in the camera module 10.

Furthermore, in the camera module 110, since the slope of the sloped portion 134 is formed on the upper face (the face facing the lens 121) of the supporting component 132, the size of the upper opening 133U of the opening 133 is inevitably larger than the size A2 of the lower opening 133D.

Supposing that the size A1 of the upper opening 33U in the camera module 10 is same to the size of the upper opening 133U in the camera module 110, the size A2 of the lower opening 133D in the camera module 110 is smaller than the size A1 of the upper opening 33U in the camera module 10 because the size A2 of the lower opening 133D is smaller than the size of the upper opening 133U. Therefore, the opening 133 in the camera module 110 can be made smaller in size than the opening 33 in the camera module 10.

Furthermore, the IRCF 35 and the IRCF 135 are disposed on the underside of the supporting component 32 and the supporting component 132 so as to cover the opening 33 and the opening 133, respectively. Therefore, the IRCF 35 needs to have a size B1 larger than the lower opening 33D in the camera module 10, whereas the IRCF 135 needs to have a size B2 larger than the size A2 of the lower opening 133D in the camera module 110.

In the camera module 10, since the slope of the sloped portion 34 is formed on the lower face (the face facing the imaging element 36) of the supporting component 32, the size of the lower opening 33D of the opening 33 is inevitably larger than the size A1 of the upper opening 33U.

Supposing that the size A2 of the lower opening 133D is same to the size A1 of the upper opening 33U, the size of the lower opening 33D is larger than the size A2 of the lower opening 133D in the camera module 110 because the size of the lower opening 33D is larger than the size A1 of the upper opening 33U. That is, the size A2 of the lower opening 133D is smaller than the size of the lower opening 33D. Therefore, the size B2 of the IRCF 135 disposed so as to cover the lower opening 133D can be made smaller than the size B1 of the IRCF 35 disposed so as to cover the lower opening 33D.

Furthermore, supposing that the lens 121 is disposed in the camera module 110 at the same position (height) as the lens 21, the tip of the sloped portion 134 and the lens 121 are less likely to interfere with each other than in the camera module 10, and therefore, the lens 121 can be placed at a position lower than the lens 21 to be closer to the imaging element 136. In this case, the height C2 of the lens unit 120 in the camera module 110 can be made less than the height C1 of the lens unit 20 in the camera module 10, and resultingly, the overall height (total height) of the lens unit 120 can be made smaller, and thus the height of the camera module 110 can be reduced.

Here, in the lens unit 120, in a case where the lower portion of the lens 121, that is, the portion facing the supporting component 132 in the lens 121, protrudes from the bottom of the lens barrel 122, the height of the camera module 110 can be reduced more effectively.

An overall configuration of the camera module 110 has been described above. The following describes in detail a configuration of the sloped portion 134 of the supporting component 132 in the camera module 110.

Example Configuration of Sloped Portion 134

The sloped portion 134 can be formed to have a reflection control structure in which reflection of light coming from the lens 121 is restricted.

Figure 5:
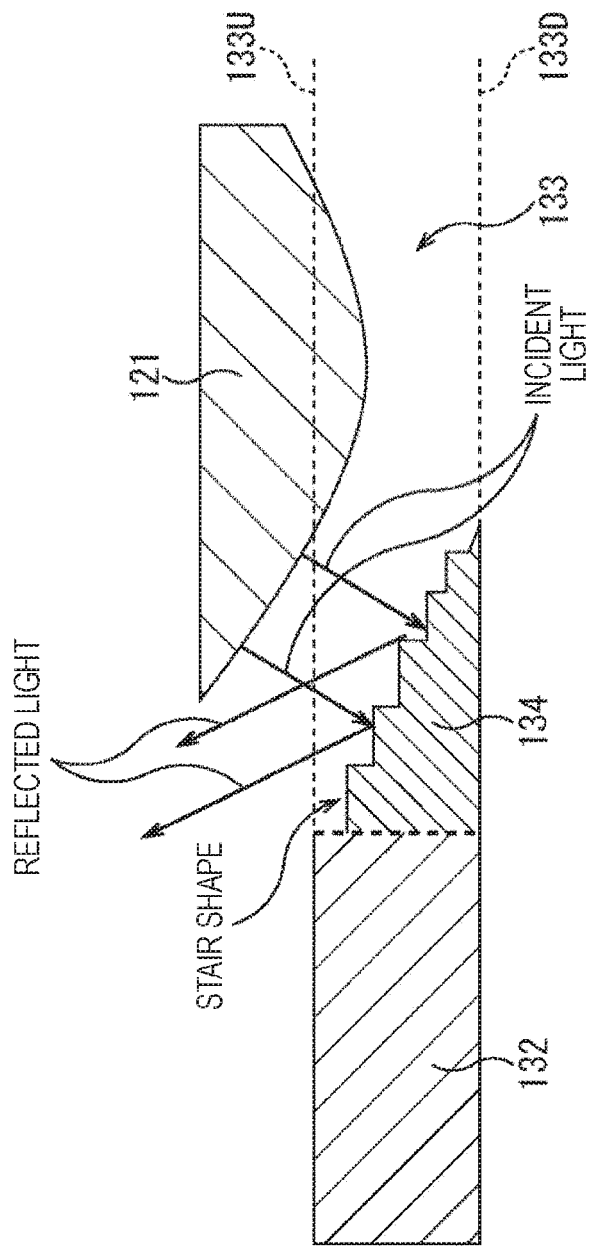
FIG. 5 is a cross-sectional view illustrating a first example configuration of a sloped portion 134.

FIG. 5 is a cross-sectional view illustrating a first example configuration of the sloped portion 134.

In FIG. 5, (the slope of) the sloped portion 134 in the camera module 110 is formed to have a stair-shaped structure as the reflection control structure.

Since the sloped portion 134 is formed into a stair shape as above, the light coming from the lens 121 is incident on the sloped portion 134 at a greater incident angle than in the sloped portion 134 having a continuous (smooth) slope, and thus the light coming from the lens 121 and incident on the sloped portion 134 is more likely to be reflected toward the outside of the lens 121. Therefore, the light reflected from the sloped portion 134 can be inhibited from returning (or being reflected toward) the lens 121. As a result, ghosts and flares caused by the light reflected from the sloped portion 134 can be reduced.

Figure 6:
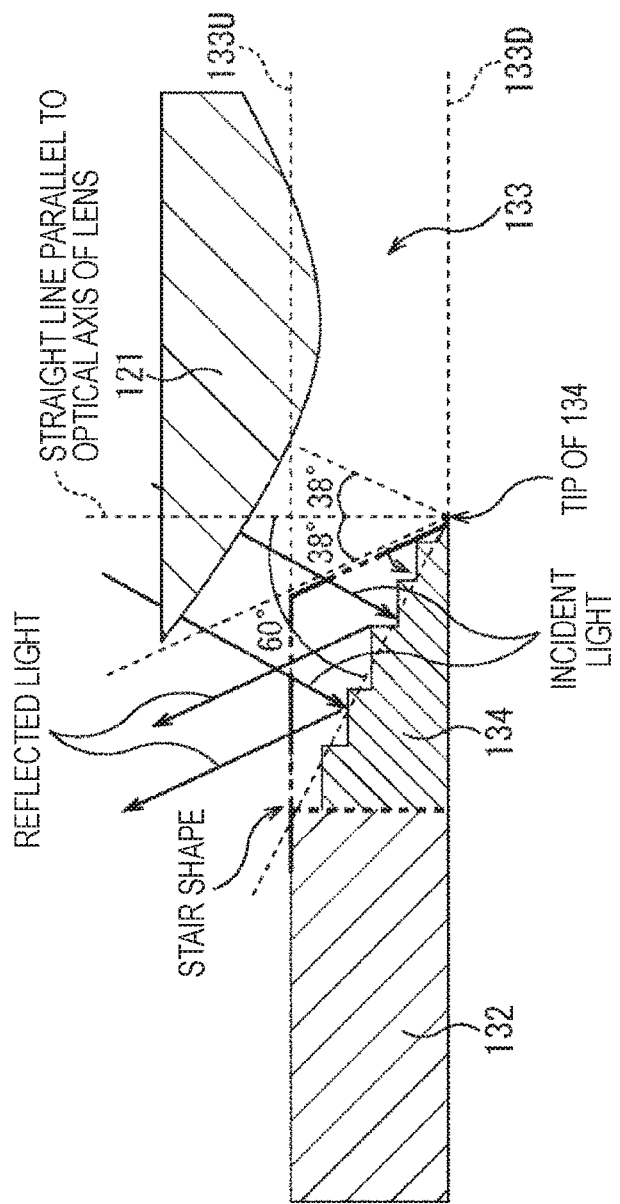
FIG. 6 is a cross-sectional view for explaining a slope of the first example configuration of the sloped portion 134.

FIG. 6 is a cross-sectional view for explaining the slope of the first example configuration of the sloped portion 134.

The sloped portion 134 can be configured such that an inclination angle of the sloped portion 134 with respect to the optical axis of the lens 121 is greater than an angle of light (an incident angle of light) coming from the lens 121 and incident on the tip of the sloped portion 134 with respect to the optical axis of the lens 121.

In FIG. 6, the incident angle of the light coming from the lens 121 and incident on the tip of the sloped portion 134 is 38 degrees, whereas the angle of inclination (hereinafter also referred to as an inclination angle) of the sloped portion 134 with respect to the optical axis of the lens 121 is 60 degrees, which is greater than 38 degrees.

As described above, in a case where the inclination angle of the sloped portion 134 formed into a stair shape is larger than the incident angle of the light coming from the lens 121 and incident on the tip of the sloped portion 134, the riser (upright wall) portion (vertical portion) of the stair of the sloped portion 134 is lower. Therefore, the light reflected from the tread portion (horizontal portion) of the stair of the sloped portion 134 can be inhibited from being further reflected from the riser portion of the stair. As a result, the occurrence of ghosts and flares caused by secondary reflected light can be suppressed, the secondary reflected light being generated when the light coming from the lens 121 and incident on the sloped portion 134 is reflected from the riser portion of the stair.

Figure 7:
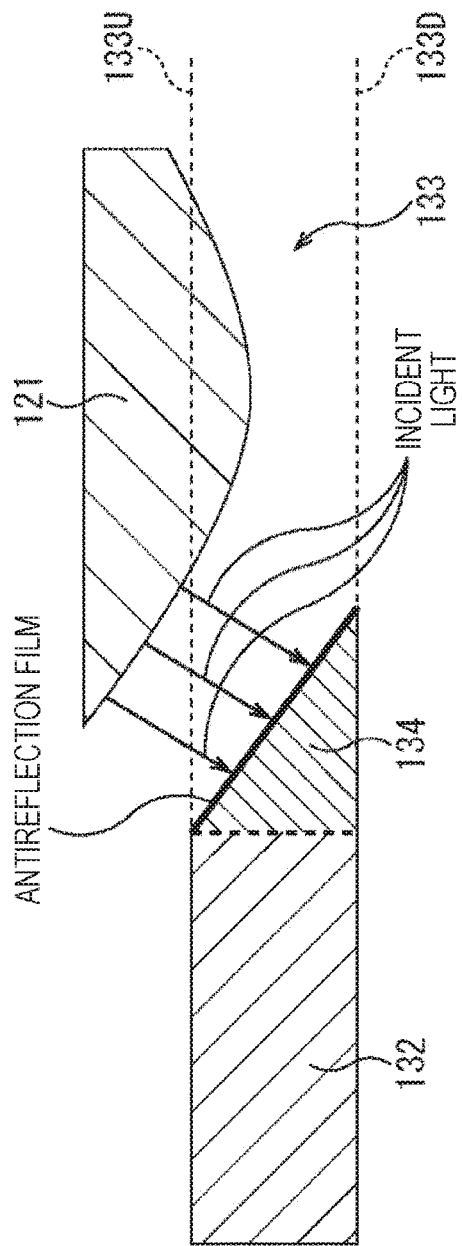
FIG. 7 is a cross-sectional view illustrating a second example configuration of the sloped portion 134.

FIG. 7 is a cross-sectional view illustrating a second example configuration of the sloped portion 134.

In FIG. 7, the sloped portion 134 of the camera module 110 has, as a reflection control structure, a structure in which an antireflection film that prevents reflection of light is formed on the slope of the sloped portion 134.

The antireflection film can be formed by, for example, applying an antireflection agent or sticking an antireflection sheet to the slope, or the like.

In a case where an antireflection film is formed on the sloped portion 134 as above, the light coming from the lens 121 and incident on the sloped portion 134 can be prevented from being reflected. Therefore, ghosts and flares caused by the light reflected from the sloped portion 134 can be reduced.

Note that the sloped portion 134 in FIG. 7 is continuously inclined, but the sloped portion 134 may be formed into a stair shape as illustrated in FIG. 5 and an antireflection film can be formed on the stair-shaped sloped portion 134.

Figure 8:
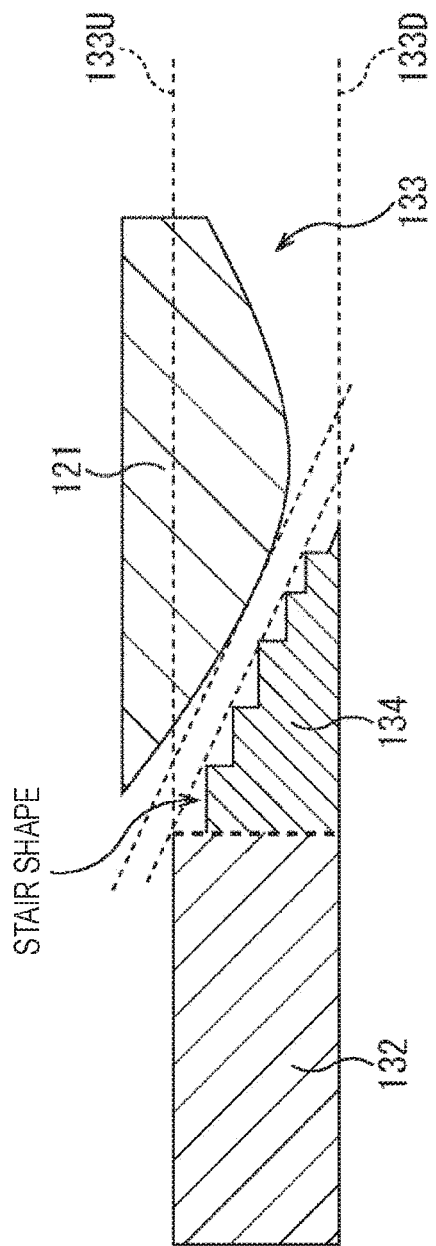
FIG. 8 is a cross-sectional view for explaining an example of a relationship between the slope of the sloped portion 134 and the lens 121.

FIG. 8 is a cross-sectional view for explaining an example of a relationship between the slope of the sloped portion 134 and the lens 121.

The slope of the sloped portion 134 can be formed into, in a cross-sectional view, a linear shape that is substantially parallel to a tangent line to the face of a lower portion of the lens 121 (a portion facing the supporting component 132).

In a case where the slope of the sloped portion 134 is formed into a shape substantially parallel to a tangent line to the face of a lower portion of the lens 121 as above, the lens 121 can be placed further lower (closer to the imaging element 136). Accordingly, the overall height of the lens unit 120 can be further reduced, and resultingly, the height of the camera module 110 can be further reduced.

Note that the sloped portion 134 in FIG. 8 is formed into a stair shape, but the sloped portion 134 may be formed, for example, to have a continuous slope as illustrated in FIG. 7.

Figure 9:
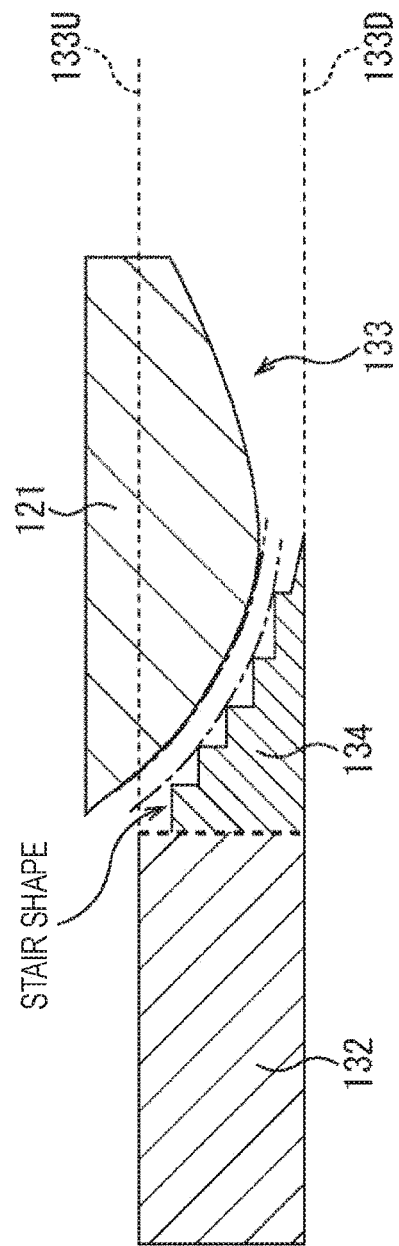
FIG. 9 is a cross-sectional view for explaining another example of the relationship between the slope of the sloped portion 134 and the lens 121.

FIG. 9 is a cross-sectional view for explaining another example of the relationship between the slope of the sloped portion 134 and the lens 121.

The slope of the sloped portion 134 can be formed into, in a cross-sectional view, a curved shape (a non-linear shape) that is substantially parallel to the face of a lower portion of the lens 121 (a portion facing the supporting component 132).

In a case where the slope of the sloped portion 134 is formed into a shape substantially parallel to the face of a lower portion of the lens 121 as above, the lens 121 can be placed further lower. Accordingly, the overall height of the lens unit 120 can be further reduced, and resultingly, the height of the camera module 110 can be further reduced.

Note that the sloped portion 134 in FIG. 9 is formed into a stair shape, but the sloped portion 134 may be formed, for example, to have a continuous slope as illustrated in FIG. 7.

Figure 10:
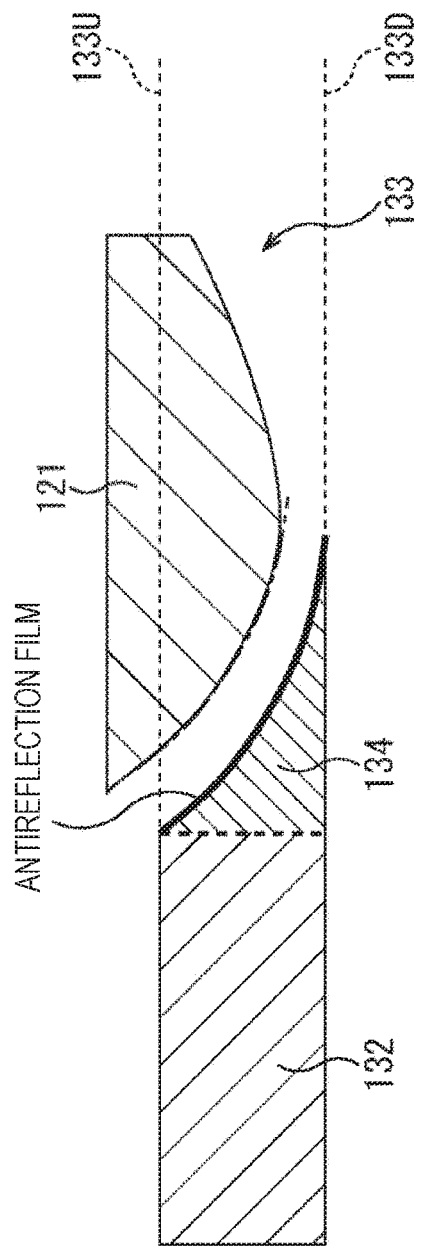
FIG. 10 is a cross-sectional view for explaining an example of the relationship between the slope of the sloped portion 134 and the lens 121 in a case where the sloped portion 134 is continuously inclined.

FIG. 10 is a cross-sectional view for explaining an example of the relationship between the slope of the sloped portion 134 and the lens 121 in a case where the sloped portion 134 is continuously inclined.

The sloped portion 134 in FIG. 10 is formed to be continuously inclined, and the slope of the sloped portion 134 is formed into, in a cross-sectional view, a curved shape substantially parallel to the face of a lower portion of the lens 121 (a portion facing the supporting component 132). Furthermore, in FIG. 10, an antireflection film is formed on the sloped portion 134.

In a case where the slope of the sloped portion 134 is formed into a shape substantially parallel to the face of a lower portion of the lens 121 as above, the lens 121 can be placed further lower. Accordingly, the overall height of the lens unit 120 can be further reduced, and resultingly, the height of the camera module 110 can be further reduced.

Figure 11:
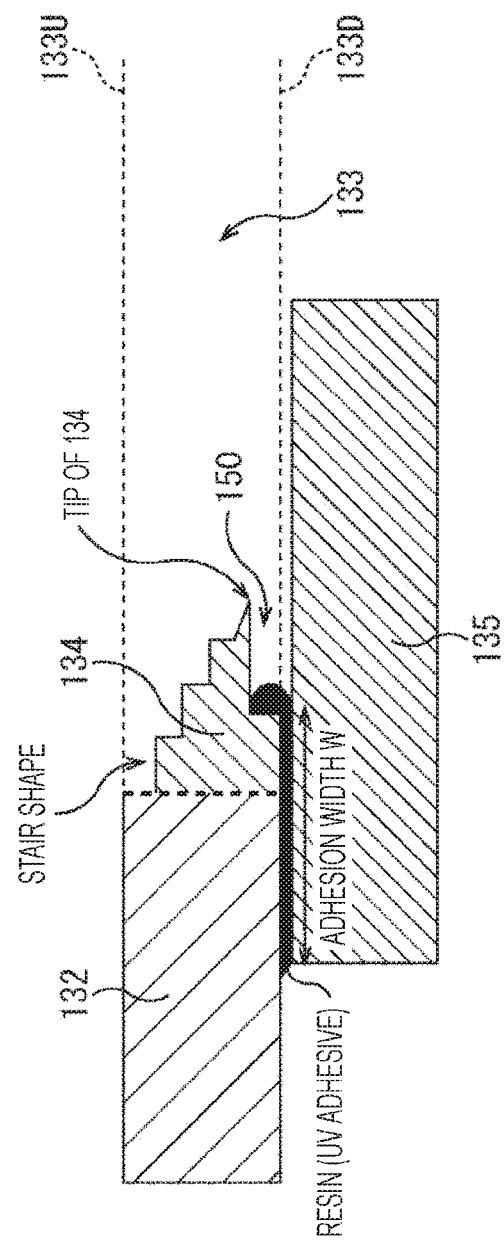
FIG. 11 is a cross-sectional view illustrating a third example configuration of the sloped portion 134.

FIG. 11 is a cross-sectional view illustrating a third example configuration of the sloped portion 134.

In FIG. 11, the sloped portion 134 is formed into a stair shape as in FIG. 5.

Furthermore, in FIG. 11, a resin reservoir 150, which is a groove recessed from the tip of the sloped portion 134, is disposed in the sloped portion 134 on the lower face of the supporting component 132.

The IRCF 135 is bonded to the lower face of the supporting component 132 across a predetermined adhesion width W. Examples of an adhesive that can be employed for bonding the IRCF 135 include a resin such as an ultra violet (UV) adhesive.

In a case where the resin reservoir 150 is disposed in the sloped portion 134 as above, when the IRCF 135 is bonded to the lower face of the supporting component 132 with an UV adhesive, the UV adhesive on the IRCF 135 flowing toward the resin reservoir 150 can be held in the resin reservoir 150. Therefore, the UV adhesive can be prevented from flowing out of the tip of the sloped portion 134 of the supporting component 132.

As a result, it is made possible to suppress reflection of the light coming from the lens 121 and reflected from the UV adhesive, if any, that flows out of the tip of the sloped portion 134 of the supporting component 132, and to reduce ghosts and flares caused by the light reflected from the UV adhesive.

Figure 12:
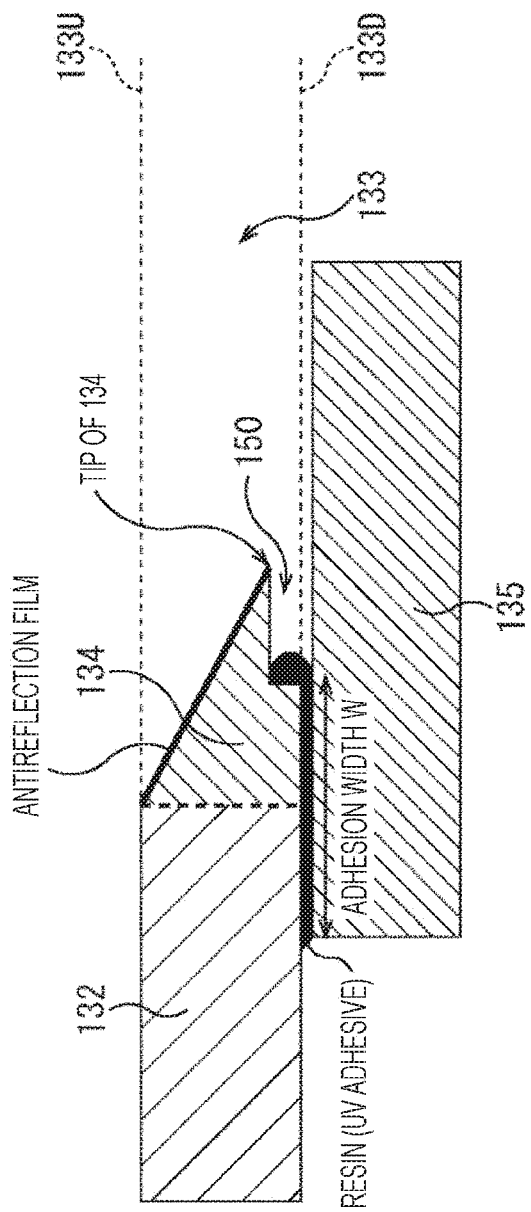
FIG. 12 is a cross-sectional view illustrating a fourth example configuration of the sloped portion 134.

FIG. 12 is a cross-sectional view illustrating a fourth example configuration of the sloped portion 134.

Note that the portions in the figure corresponding to the portions in FIG. 11 are given the same reference numerals, and descriptions of these portions are omitted below as appropriate.

The sloped portion 134 in FIG. 12 is configured in a similar manner to the sloped portion in FIG. 11 showing that the slope is formed into a stair shape, except that the sloped portion 134 is continuously inclined and an antireflection film is formed thereon.

Therefore, as in FIG. 11, ghosts and flares caused by reflection of light from the UV adhesive can be reduced in FIG. 12.

As an adhesive for bonding the IRCF 135 to the supporting component 132, a thermoplastic resin or a thermosetting resin can be employed as well as a UV adhesive. As a thermoplastic resin or thermosetting resin serving as an adhesive, a black thermoplastic resin or thermosetting resin can be employed.

In a case where a black thermoplastic resin or thermosetting resin is employed as an adhesive for bonding the IRCF 135 to the supporting component 132, the resin reservoir 150 disposed at the tip of the sloped portion 134 as illustrated in FIGS. 11 and 12 may not necessarily be provided because the light from the lens 121 is prevented from being reflected from the thermoplastic resin or thermosetting resin that flows out of the adhesion between the supporting component 132 and the IRCF 135.

That is, in a case where a black thermoplastic resin or thermosetting resin is employed as an adhesive for bonding the IRCF 135 to the supporting component 132, the sloped portion 134 can be configured without providing the resin reservoir 150.

Figure 13:
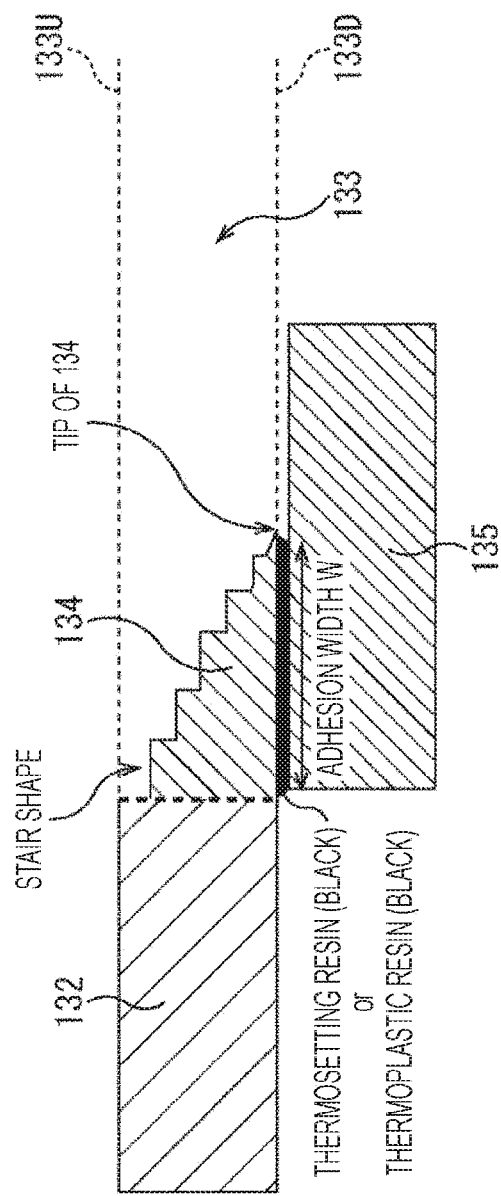
FIG. 13 is a cross-sectional view illustrating an example of adhesion between a supporting component 132 and an IRCF 135 in a case where a black thermoplastic resin or thermosetting resin is employed as an adhesive.
Figure 14:
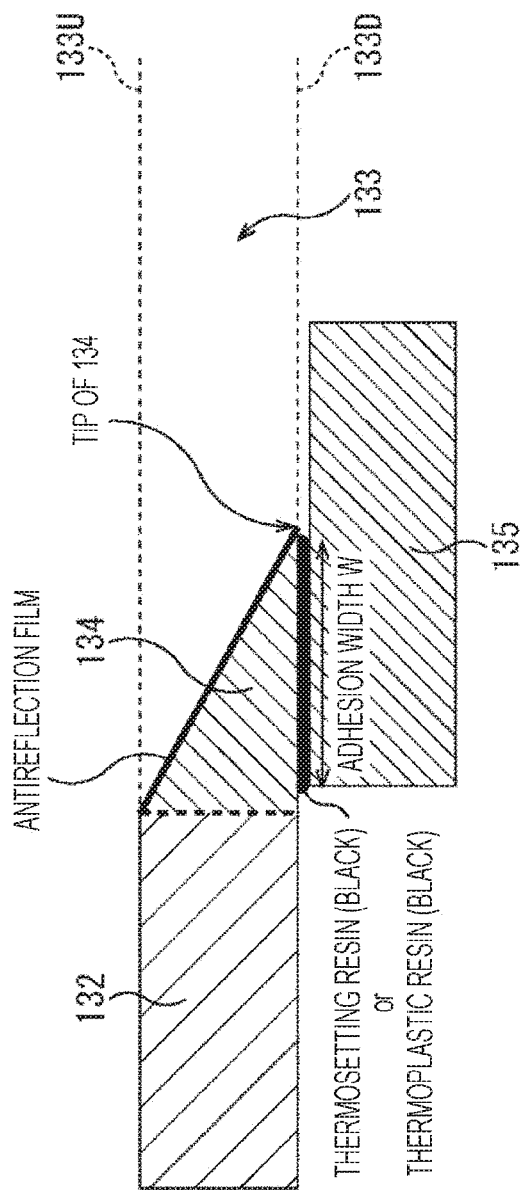
FIG. 14 is a cross-sectional view illustrating an example of adhesion between the supporting component 132 and the IRCF 135 in a case where a black thermoplastic resin or thermosetting resin is employed as an adhesive.

Each of FIGS. 13 and 14 is a cross-sectional view illustrating an example of adhesion between the supporting component 132 and the IRCF 135 in a case where a black thermoplastic resin or thermosetting resin is employed as an adhesive.

In a case where a black thermoplastic resin or thermosetting resin is employed as the adhesive, the supporting component 132 can be configured without disposing the resin reservoir 150 at the tip of the sloped portion 134, and the supporting component 132 can be bonded to the IRCF 135.

Note that the sloped portion 134 is formed into a stair shape in FIG. 13, and, in FIG. 14, the sloped portion 134 is formed to have a continuous slope and an antireflection film is formed on the slope.

In a case where the IRCF 135 is bonded to the lower face of the supporting component 132 with a black thermoplastic resin or thermosetting resin, even if the black thermoplastic resin or thermosetting resin flows out of the tip of the sloped portion 134 of the supporting component 132, the light coming from the lens 121 and incident on the flowing out black thermoplastic resin or thermosetting resin can be prevented from being reflected. Therefore, ghosts and flares caused by the light coming from the lens 121 and reflected from the flowing out black thermoplastic resin or thermosetting resin can be reduced without disposing the resin reservoir 150 illustrated in FIGS. 11 and 12.

Furthermore, as compared with the case where the resin reservoir 150 is disposed, a greater adhesion width W for the IRCF 135 can be secured without disposing the resin reservoir 150. Therefore, in a case where the resin reservoir 150 is not disposed, the size of the IRCF 135 can be made smaller if the adhesion width W same to the adhesion width applicable to the case where the resin reservoir 150 is disposed is secured.

Note that the resin reservoir 150 can be disposed even when a black thermoplastic resin or thermosetting resin is employed as the adhesive.

As described above, in a case where the lens 121 in the camera module 110 is placed at the same position (height) as the lens 21 in the camera module 10 while the supporting component 132 is placed such that the slope of the sloped portion 134 faces the lens 121, the tip of the sloped portion 134 is present lower (closer to the imaging element 136) than the tip of the sloped portion 34 in the camera module 10. Therefore, the distance between the tip of the sloped portion 134 and the bottom portion of the lens 121 is longer, and resultingly, the tip of the sloped portion 134 is less likely to interfere with the bottom portion of the lens 121. Therefore, as compared with the camera module 10, the camera module 110 imposes less strict physical restriction on the position where the lens 121 is placed.

As a result, the lens 121 can be placed on the lower side (closer to the imaging element 136) in the camera module 110 to make the distance between the lens 121 and the imaging element 136 shorter. Therefore, a lens having a shorter BF can be employed as the lens 121. Furthermore, the flexibility in designing the lens 121 can be improved, and a lens having better characteristics (performance) can be designed and employed as the lens 121.

Moreover, the overall height of the lens 121 and the height of camera module 110 can be reduced.

Note that the reduction in height of the camera module 110 can be replaced with additional flexibility in designing the lens to improve the performance of the lens 121.

Furthermore, the size of the opening 133 in the camera module 110 can be reduced. In other words, it is possible to make the size of the lower opening 133D in the camera module 110 smaller than the size of the lower opening 33D in the camera module 10. Therefore, the size of the IRCF 135 disposed to cover the opening 133 (the lower opening 133D of the opening 133) can be made smaller than the size of the IRCF 35 disposed to cover the opening 33 (the lower opening 33D of the opening 33). As a result, the cost of the IRCF 135 can be reduced.

Furthermore, since the size of the opening 133 in the camera module 110 can be reduced, the light coming from the lens 121 and passing through the opening 133 can be inhibited from entering the outside of the effective pixels 137 of the imaging element 136, such as the gold wire 139 or an electrode pad (not illustrated). As a result, it is made possible to reduce stray light coming from the lens 121 and reflected from the outside of the effective pixels 137 of the imaging element 136, and thus ghosts and flares caused by such stray light can be reduced.

Second Embodiment

Figure 15:
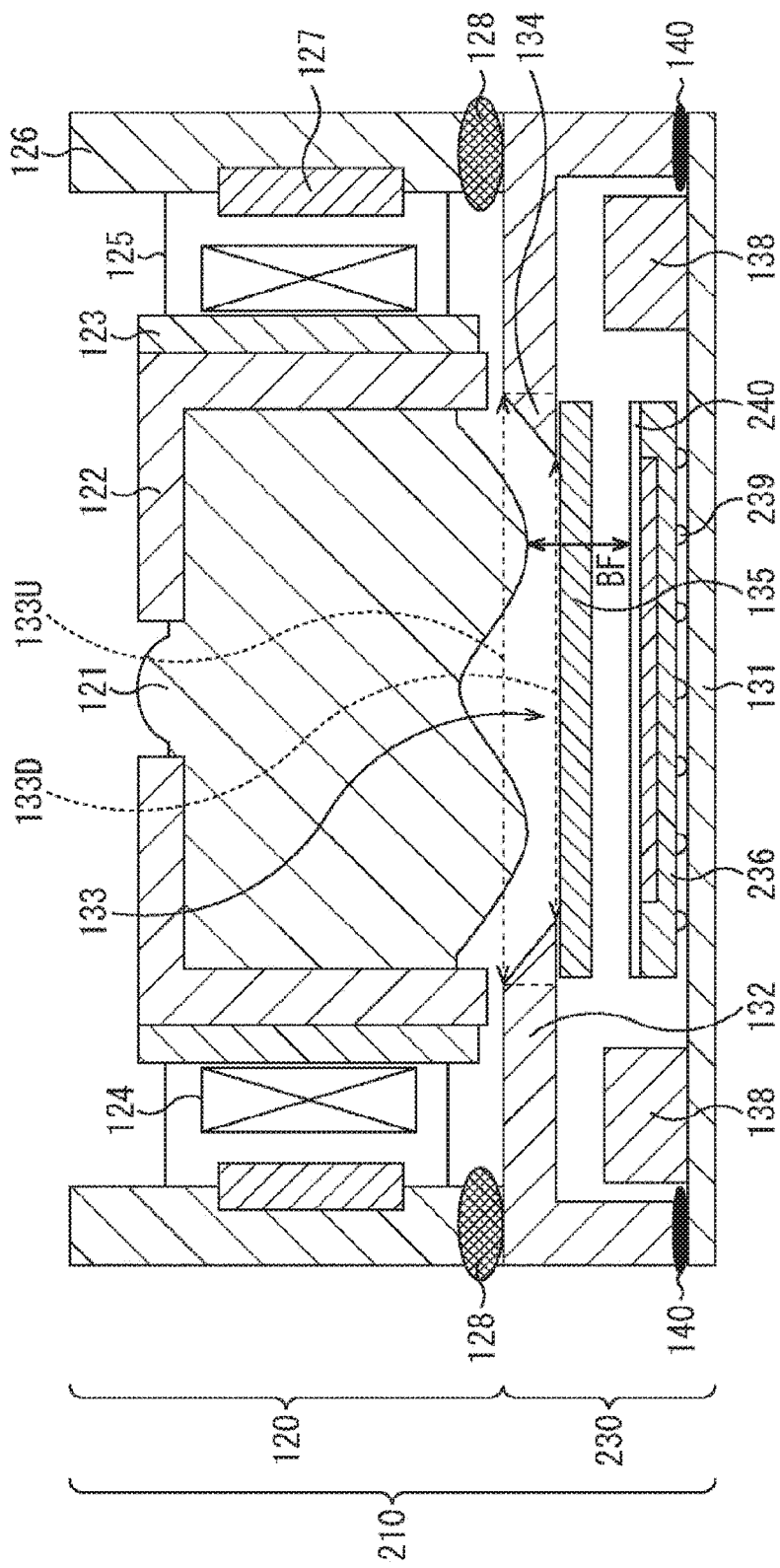
FIG. 15 is a cross-sectional view illustrating an example configuration of a camera module to which the present technology is applied according to a second embodiment.

FIG. 15 is a cross-sectional view illustrating an example configuration of a camera module to which the present technology is applied according to a second embodiment.

Note that the portions in the figure corresponding to the portions in FIG. 2 are given the same reference numerals, and descriptions of these portions are omitted below as appropriate.

The camera module 210 illustrated in FIG. 15 includes the lens unit 120 and an imaging unit 230.

Therefore, the camera module 210 is in common with the camera module 110 in FIG. 2 in that the lens unit 120 is included.

However, the camera module 210 is different from the camera module 110 in that an imaging unit 230 is disposed in place of the imaging unit 130.

The imaging unit 230 includes the substrate 131, the supporting component 132, the IRCF 135, the mounted component 138, and an imaging element 236.

Therefore, the imaging unit 230 is in common with the imaging unit 130 in FIG. 2 in that the imaging unit 230 includes the substrate 131, the supporting component 132, the IRCF 135, and the mounted component 138.

However, the imaging unit 230 is different from the imaging unit 130 in that the imaging element 236 is disposed in place of the imaging element 136.

The imaging element 236 is a semiconductor device called a wafer level chip size package (WLCSP). On its light-receiving face (the upper side) to receive light, a protective glass 240 is disposed.

On the imaging element 236 being a WLCSP, a solder ball 239 serving as an electrical contact with the outside is disposed. The imaging element 236 is mounted on the substrate 131 by flip chip bonding, and is electrically connected to the substrate 131 via the solder ball 239.

In the camera module 210, ghosts or flares may be caused by the light passing through the opening 133 and reflected from a side face of the protective glass 240 disposed on the upper side of the imaging element 236, which is a WLCSP. However, since the size of the opening 133 in the camera module 210 can be reduced, it is possible to inhibit the light from being reflected from a side face of the protective glass 240; that is, it is possible to inhibit the light from being incident on a side face of the protective glass 240, and thus ghosts and flares caused by reflection of light from a side face of the protective glass 240 can be reduced.

Third Embodiment

Figure 16:
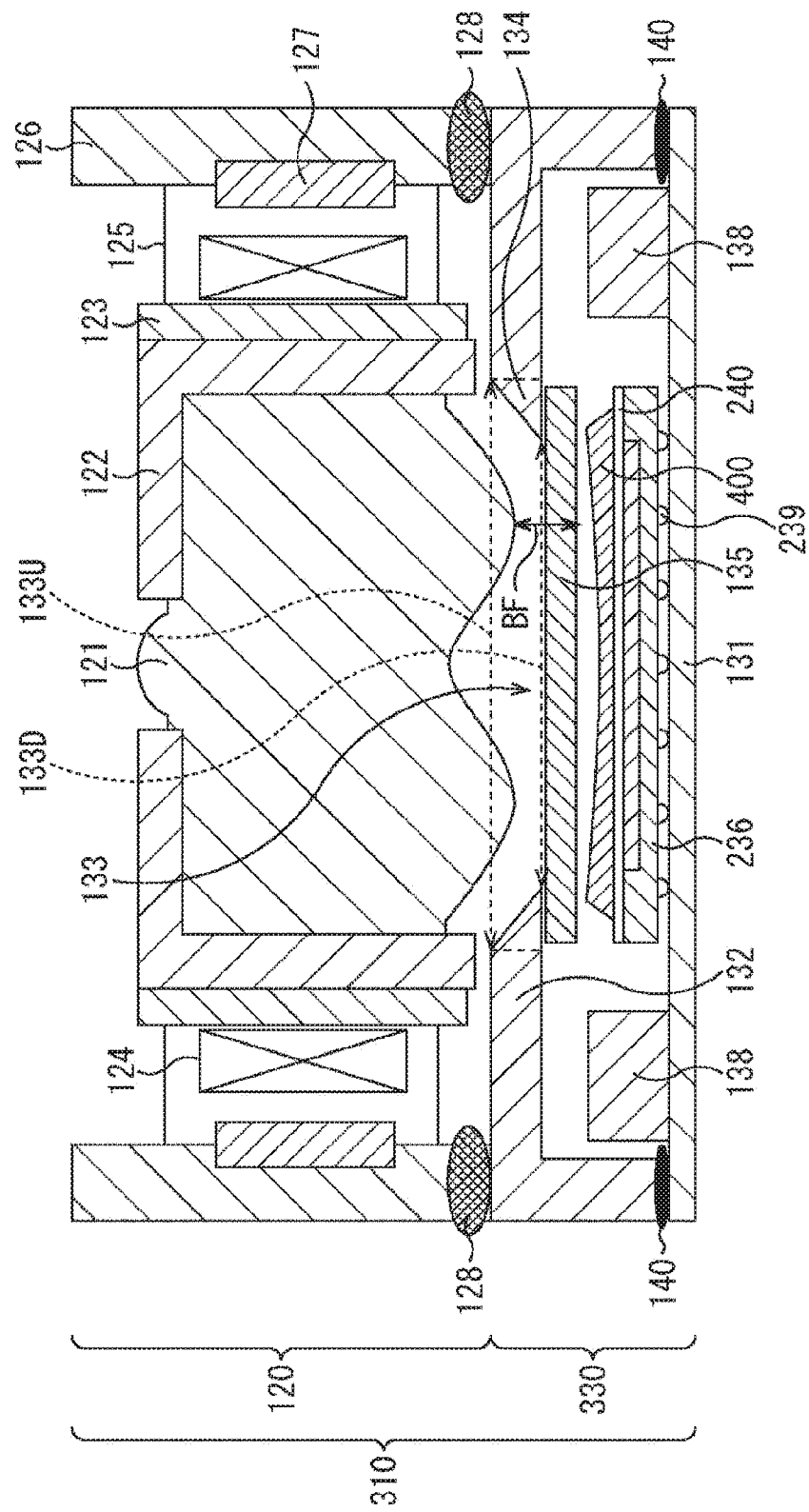
FIG. 16 is a cross-sectional view illustrating an example configuration of a camera module to which the present technology is applied according to a third embodiment.

FIG. 16 is a cross-sectional view illustrating an example configuration of a camera module to which the present technology is applied according to a third embodiment.

Note that the portions in the figure corresponding to the portions in FIG. 15 are given the same reference numerals, and descriptions of these portions are omitted below as appropriate.

The camera module 310 illustrated in FIG. 16 includes the lens unit 120 and an imaging unit 330.

Therefore, the camera module 310 is in common with the camera module 210 in FIG. 15 in that the lens unit 120 is included.

However, the camera module 310 is different from the camera module 210 in that the imaging unit 330 is disposed in place of the imaging unit 230.

The imaging unit 330 includes the substrate 131, the supporting component 132, the IRCF 135, the mounted component 138, the imaging element 236, and a wafer level lens (WLL) 400.

Therefore, the imaging unit 330 is in common with the imaging unit 230 in FIG. 15 in that the imaging unit 330 includes the substrate 131, the supporting component 132, the IRCF 135, the mounted component 138, and the imaging element 236.

However, the imaging unit 330 is different from the imaging unit 230, which does not include the WLL 400, in that the WLL 400 is additionally disposed in the imaging unit 330.

The WLL 400 is disposed on top of the imaging element 236 (on top of the protective glass 240 disposed on the upper side the imaging element 236).

A WLCSP provided with a WLL is called a wafer level lens chip size package (WLLCSP). Therefore, the imaging element 236 provided with the WLL 400 constitutes a WLLCSP.

In the camera module 310, ghosts or flares may be caused by the light passing through the opening 133 and reflected from a side face of the protective glass 240 included in the WLLCSP or from a side face of the WLL 400. However, since the size of the opening 133 in the camera module 310 can be reduced, it is possible to inhibit the light from being reflected from a side face of the protective glass 240 or a side face of the WLL 400; that is, it is possible to inhibit the light from being incident on a side face of the protective glass 240 or of the WLL 400, and thus ghosts and flares caused by reflection of light from a side face of the protective glass 240 or a side face of the WLL 400 can be reduced.

Example Usage of Camera Module

Figure 17:
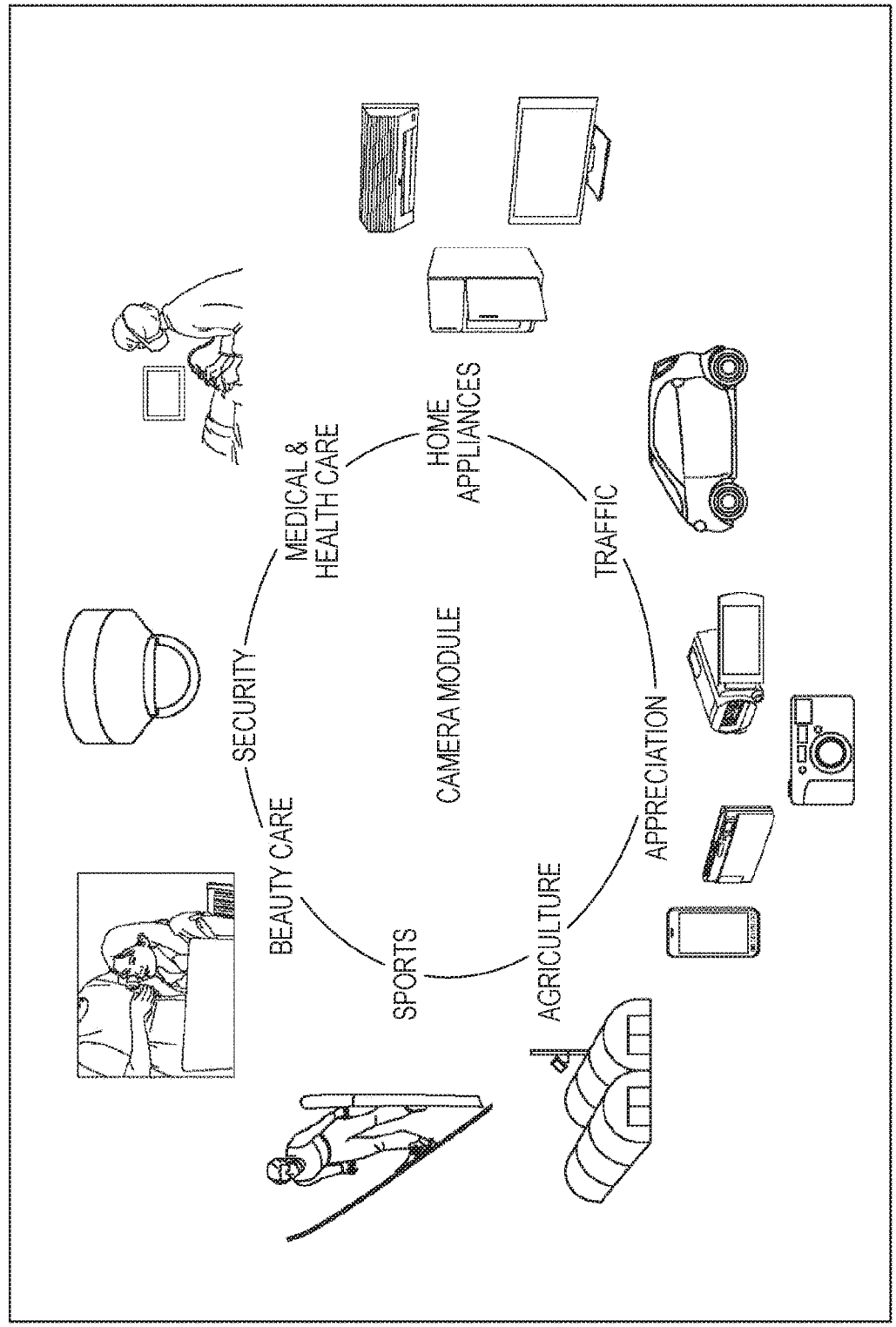
FIG. 17 is a diagram illustrating example usage of the camera modules 110, 210, and 310 to which the present technology is applied.

FIG. 17 is a diagram illustrating example usage of the camera modules 110, 210, and 310 to which the present technology is applied.

For example, the camera module 110 can be used for various electronic devices that sense light such as visible light, infrared light, ultraviolet light, and X-rays, as described below. The same applies to the camera module 210 in FIG. 15 and the camera module 310 in FIG. 16.

Electronic devices that take images for appreciation, such as digital cameras and mobile devices with camera functions Electronic devices used for traffic for the purpose of automatic stop and other safe driving, recognition of the state of a driver, and the like, such as car-mounted sensors that take images of the front, rear, surroundings, and inside of a car, monitoring cameras that monitor running vehicles and roads, distance measuring sensors that measure the distance between vehicles, and the like Electronic devices used for home appliances for the purpose of taking images of the user's gesture and operating the appliance in accordance with the gesture, such as TVs, refrigerators, and air conditioners Electronic devices used for medical care and healthcare, such as endoscopes, electron microscopes, and devices that receive infrared light to image blood vessels Electronic devices used for security, such as monitoring cameras for security and cameras for person authentication Electronic devices used for beauty care, such as skin measuring devices that take images of skins and microscopes that take images of scalp Electronic devices used for sports, such as action cameras and wearable cameras for sports application and the like Electronic devices used for agriculture, such as cameras for monitoring the condition of farms and crops Embodiments of the present technology are not limited to the above-described embodiments, and various modifications can be made thereto without departing from the gist of the present technology.

Note that the effects described herein are examples only and are not restrictive, and other effects not described herein may be provided.

<Others>

The present technology may have the following configurations.

(1)

A camera module including:

a supporting component that includes an opening through which light from a lens collecting the light passes, the supporting component supporting an optical component between the lens and an imaging element that performs photoelectric conversion of the light, the optical component being placed so as to cover the opening and being supported on a side of the supporting component closer to the imaging element, in which the camera module is configured such that:

a sloped portion inclined in a thickness direction of the supporting component is disposed around the opening;

the supporting component is placed so that a slope of the sloped portion and the lens face each other; and a portion of the lens is placed closer to a first face of the supporting component beyond a second face of the supporting component, the portion facing the supporting component, the optical component being placed on the first face, and the second face being opposite to the first face.

(2)

The camera module according to (1), in which the sloped portion includes a reflection control structure in which reflection of the light coming from the lens is controlled.

(3)

The camera module according to (2), in which the sloped portion includes a stair shape as the reflection control structure.

(4)

The camera module according to (3), in which an inclination angle of the sloped portion with respect to an optical axis of the lens is greater than an angle of the light with respect to the optical axis, the light coming from the lens and being incident on a tip of the sloped portion.

(5)

The camera module according to (2), in which as the reflection control structure, an antireflection film that prevents reflection of light is formed on the sloped portion.

(6)

The camera module according to any one of (1) to (5), in which the sloped portion includes a shape parallel to a tangent line to a face of a portion of the lens, the portion facing the supporting component.

(7)

The camera module according to any one of (1) to (5), in which the sloped portion includes a shape parallel to a face of a portion of the lens, the portion facing the supporting component.

(8)

The camera module according to any one of (1) to (7), in which a groove recessed from a tip of the sloped portion is disposed on the first face of the supporting component.

(9)

The camera module according to (8), in which the optical component is bonded to the first face of the supporting component with an adhesive.

(10)

The camera module according to any one of (1) to (9), in which the optical component is bonded to the first face of the supporting component with a thermoplastic resin or a thermosetting resin.

(11)

The camera module according to any one of (1) to (10), in which the optical component includes an infrared cut-off filter (IRCF).

REFERENCE SIGNS LIST

10 Camera module
20 Lens unit
21 Lens
22 Lens barrel
23 Lens holder
24 Coil
25 Spring
26 Actuator unit
27 Magnet
28 Adhesive
30 Imaging unit
31 Substrate
32 Supporting component
33 Opening
33U Upper opening
33D Lower opening 34 Sloped portion
35 IRCF
36 Imaging element
37 Effective pixels
38 Mounted component
39 Gold wire
40 Adhesive
110 Camera module
120 Lens unit
121 Lens
122 Lens barrel
123 Lens holder
124 Coil
125 Spring
126 Actuator unit
127 Magnet
128 Adhesive
130 Imaging unit
131 Substrate
132 Supporting component
133 Opening
133U Upper opening
133D Lower opening
134 Sloped portion
135 IRCF
136 Imaging element
137 Effective pixels
138 Mounted component
139 Gold wire
140 Adhesive
150 Resin reservoir
210 Camera module
230 Imaging unit
236 Imaging element
239 Solder ball
240 Protective glass
310 Camera module
400 WLL

The invention claimed is:

1. A camera module, comprising:
a supporting component that includes an opening through which light from a lens passes, wherein the lens collects the light;
an imaging element is configured to perform photoelectric conversion of the light; and
an optical component configured to cover the opening, wherein
the supporting component is configured to support the optical component between the lens and the imaging element,
the optical component is supported on a first side of the supporting component which is closer to the imaging element than a second side of the supporting component; and
a sloped portion around the opening, wherein
the sloped portion is inclined in a thickness direction of the supporting component,
a slope of the sloped portion faces the lens,
a portion of the lens is placed closer to a first face of the supporting component beyond a second face of the supporting component,
the portion of the lens faces the supporting component,
the optical component is placed on the first face,
the second face is opposite to the first face,
the slope portion comprises a groove which is recessed from a tip of the sloped portion, and
the groove is on the first face of the supporting component such that the groove is between the tip of the sloped portion and the optical component.

2. The camera module according to claim 1, wherein the sloped portion further includes a reflection control structure which is configured to control a reflection of the light coming from the lens.

3. The camera module according to claim 2, wherein the sloped portion further includes a stair shape as the reflection control structure.

4. The camera module according to claim 3, wherein
an inclination angle of the sloped portion with respect to an optical axis of the lens is greater than an angle of the light with respect to the optical axis,
the light come from the lens, and
the light is incident on the tip of the sloped portion.

5. The camera module according to claim 2, wherein
the reflection control structure is an antireflection film which is configured to prevent the reflection of the light, and
the antireflection film is on the sloped portion.

6. The camera module according to claim 1, wherein
the sloped portion further includes a shape parallel to a tangent line to a face of the portion of the lens.

7. The camera module according to claim 1, wherein the sloped portion further includes a shape parallel to a face of the portion of the lens.

8. The camera module according to claim 1, wherein the optical component is bonded to the first face of the supporting component with an adhesive.

9. The camera module according to claim 1, wherein the optical component is bonded to the first face of the supporting component with one of a thermoplastic resin or a thermosetting resin.

10. The camera module according to claim 1, wherein the optical component includes an infrared cut-off filter (IRCF).

11. A camera module, comprising:
a supporting component that includes an opening through which light from a lens passes, wherein the lens collects the light;
an imaging element configured to perform photoelectric conversion of the light;
an optical component configured to cover the opening, wherein
the supporting component is configured to support the optical component between the lens and the imaging element, and
the optical component is supported on a first side of the supporting component which is closer to the imaging element than a second side of the supporting component; and
a sloped portion around the opening, wherein
the sloped portion is inclined in a thickness direction of the supporting component,
a slope of the sloped portion faces the lens,
a portion of the lens is placed closer to a first face of the supporting component beyond a second face of the supporting component,
the portion of the lens faces the supporting component,
the optical component is placed on the first face,
the second face is opposite to the first face,
the sloped portion further includes a reflection control structure which is configured to control a reflection of the light coming from the lens,
the sloped portion further includes a stair shape as the reflection control structure, an inclination angle of the sloped portion with respect
to an optical axis of the lens is greater than an angle
of the light with respect to the optical axis,
the light come from the lens, and
the light is incident on a tip of the sloped portion.

* * * * *